United States Patent [19]
Shigo

[11] 3,864,627
[45] Feb. 4, 1975

[54] PROBING FOR DETECTION OF DECAY IN WOOD

[75] Inventor: Alex Shigo, Mifflin, Pa.

[73] Assignee: Northeast Electronic Corporation, Concord, N.H.

[22] Filed: Dec. 3, 1973

[21] Appl. No.: 420,932

[52] U.S. Cl............................................. 324/65 P
[51] Int. Cl.......................................... G01r 27/02
[58] Field of Search .................. 324/65 R, 65 P, 64

[56] References Cited
UNITED STATES PATENTS

| | | | |
|---|---|---|---|
| 902,753 | 11/1908 | Marshall............................ | 324/65 P |
| 1,978,440 | 10/1934 | Shepard............................ | 324/65 R |
| 2,884,594 | 4/1959 | Ludvigsen...................... | 324/65 R X |
| 3,207,981 | 9/1965 | Marsh et al....................... | 324/64 X |

Primary Examiner—Stanley T. Krawczewicz
Attorney, Agent, or Firm—Charles Hieken, Esq.; Jerry Cohen, Esq.

[57] ABSTRACT

Active decay in wood is detected by inserting a probe into a small hole in the wood, made by a drill. The probe establishes contact with the wood interior at two closely spaced points along the wall of the hole. A current is passed through the wood between the points to obtain a measure of the wood resistance and thus the degree of wood decay. The wood measured must be above the fiber-saturation point naturally, or rewet with distilled water so that the wood along the walls of the hole is above the fiber-saturation point. The probe comprises two insulatedly coated wires twisted for most of their lengths, and each ending in straight sections with respective bowed out portions spaced longitudinally from each other. A portion of the peak of each bowed portion is free of insulation at the two spaced points. The probe is connected to a meter that measures resistance to a pulsed current.

10 Claims, 2 Drawing Figures

PATENTED FEB 4 1975  3,864,627

PROBING FOR DETECTION OF DECAY IN WOOD

BACKGROUND OF THE INVENTION

The present invention relates in general to the detection of active decay in wood and more particularly to a probe that detects decay as it is moved through a small hole in the wood made by a drill. The probe is connected to a meter that measures resistance to a pulsed current.

Decay of wood involves invasion of a tree or other wood structure by a succession of different types of microorganisms. However, notwithstanding the variety of microorganisms involved there is a common mechanism produced by such invasions which enables detection of the fact of decay and measurement of the extent of decay. That is, as wood tissues are digested by microorganisms of the various kinds, the concentration of cations increases and the resistance of the decaying region of the wood structure to a pulse current decreases when the wood fiber tissues are above the fiber-saturation point. Testing techniques and apparatus utilizing this phenomenon are described in Skutt et al, "Detection of Discolored and Decayed Wood in Living Trees Using a Pulsed Electrical Current," Canadian Journal of Forestry Research, vol. 2, pp. 54–56 (1972) and Tattar et al, "Relationship Between the Degree of Resistance of a Pulsed Electric Current and Wood in Progressive States of Discoloration and Decay in Living Trees," Id., pp. 236–243, the disclosures of which are incorporated herein by reference as though set out at length herein.

It is an important object of the present invention to increase the effectiveness and reliability of the therein described techniques and apparatus.

It is a further object of the invention to provide inexpensive probing apparatus consistent with the preceding object.

It is a further object of the invention to provide a probing element which is simple to manufacture consistent with one or both of the preceding objects.

It is a further object of the invention to provide a durable probing element consistent with one or more of the preceding objects.

It is a further object of the invention to increase the accuracy of such probing apparatus consistent with one or more of the preceding objects.

It is a further object of the invention to provide a small diameter probing element consistent with one or more of the preceding objects.

It is a further object of the invention to provide flexibility of the probing element consistent with one or more of the preceding objects.

It is a further object of the invention to assure positive contact with the walls of the minute hole bored into the wood consistent with one or more of the preceding objects.

SUMMARY OF THE INVENTION

In accordance with the invention, a probing element containing multiple conductors is inserted through a small drill hole in a wood structure to a central region thereof to be tested for decay. The hole is preferably a circular bore with a diameter 3/32 inch or less, preferably 1/16 inch, or an areal equivalent of non-circular form. The probing element has spaced conductive points at the inserted end thereof and is connected at its outer or terminal end outside the wood structure to an impedance meter as more particularly described in the said publications which comprises astable multivibrator pulsing means, pulse resistance measuring means, range switch means, and read-out means. The multiple conductors of the probing element are insulated along their full lengths excepting at terminal connections with the impedance meter and at two spaced points therebetween at the inserted end of the probing element.

The multiple conductors are cyclically deformed over major portions of their respective lengths to produce an inherent spring effect at their respective inserted ends. The inserted ends are straight, except for limited portions where they are bowed out with respect to the axis of the probing element. The insulation is removed from the respective conductors in the bowed out regions and springy effect built into these ends of the conductors forces the bowed out sections against wood mass assuring the type of connection which prevents contact resistance forces from obscuring the decay indicating resistance to be measured in the probed region and otherwise meeting the foregoing objects. Solder may be put on the exposed regions to increase sensitivity of the probe.

These and other objects, features and advantages of the invention will be apparent from the following detailed description of a preferred embodiment taken in connection with the accompanying drawing, in which:

DETAILED DESCRIPTION OF PREFERRED EMBODIMENTS

Figure 1:
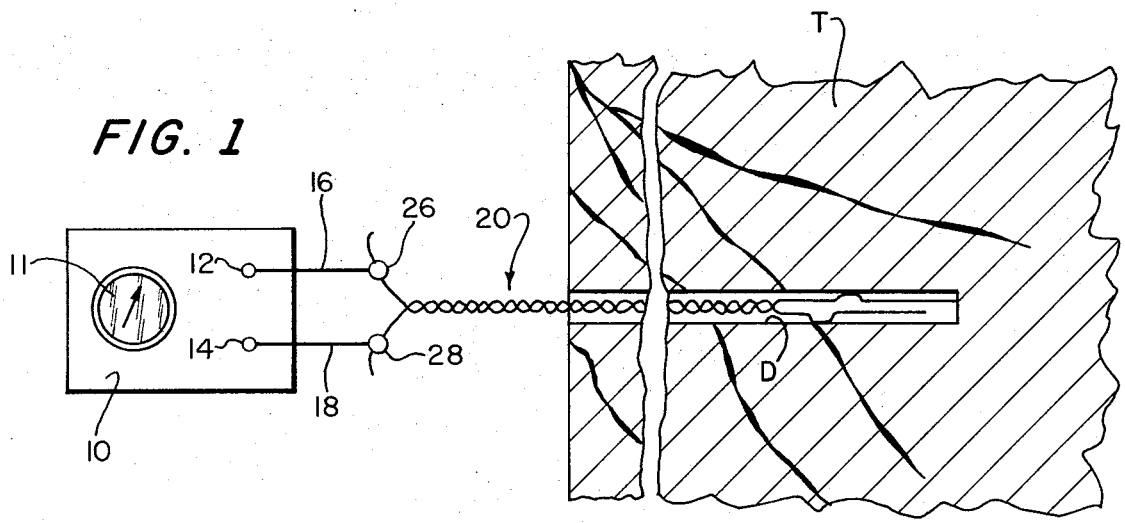
FIG. 1 is a schematic diagram of testing apparatus using a probe according to a preferred embodiment of the invention.

Referring now to FIG. 1, a pulsing impedance meter 10 comprises an astable multivibrator, impedance measuring means, amplifier means, range switching means and a readout means such as a meter movement 11. Reference is made to the foregoing publications for further description of the electrical circuitry, calibration and other details of construction and operation of such circuitry. The meter comprises terminals 12 and 14 which may be connected through jumper wires 16 and 18, respectively, to a probing element 20. The probe 20 is shown inserted through a drill hole D in a tree trunk T.

Figure 2:
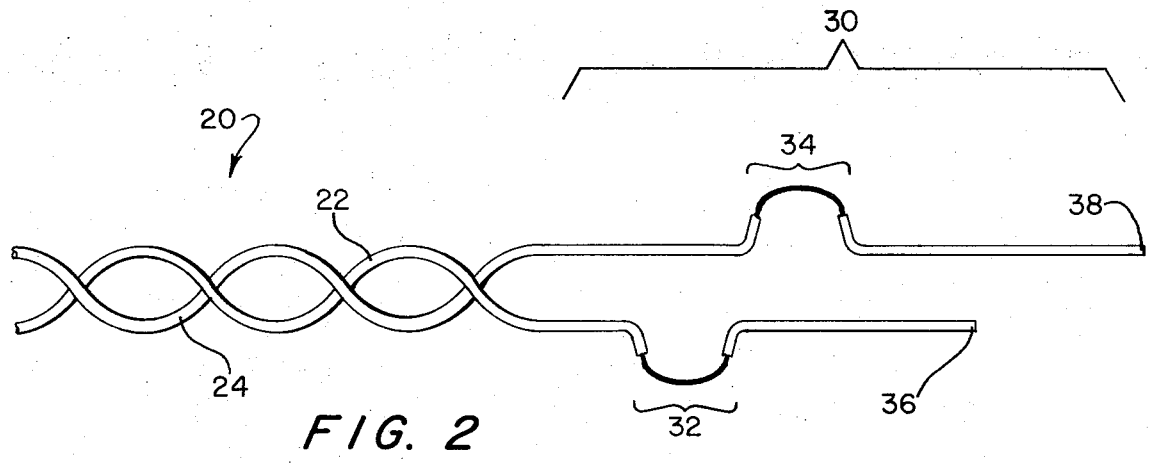
FIG. 2 is an enlarged longitudinal view of the insertable end of the probe.

The probing element, shown in more detail in the expanded longitudinal view of its insertable end 20, in FIG. 2, comprises two insulated wires 22 and 24, typically enameled wires, which are cyclically deformed over major portions, preferably over 90 percent, of the lengths thereof. Preferably, the wires are helically twisted in opposite senses with respect to each other to form a twisted pair. Insulation is removed from the wires at respective portions 26 and 28 thereof to make contact with jumpers 16 and 18 (FIG. 1). An insertion end 30 (FIG. 2) of the probing element 20 comprises straight portions of the wires 22 and 24 with longitudinally staggered bowed out sections 32 and 34 of the conductors 22 and 24, respectively. Insulation is also removed from the wires in the bowed out regions 32 and 34.

Solder may be added to regions 32 and 34, and to 26 and 28 to increase sensitivity.

The ends 36 and 38 may be specially coated with insulation, carry an insulating cap or, alternatively, reside in the bore of the tree free from contact with the wood to avoid reading spurious currents through the wood structure between said ends in lieu of the intended measuring current which will flow through the wood structure host between regions 32 and 34.

The helically twisted conductors 22 and 24 are selected in sufficiently thick wire diameter to afford the necessary stiffness and preferably 18 to 21 gauge. Preferably the helical twisting rate of each of wires 22 and 24 is from 11 to 13 turns per linear inch of probe length and the probe length is from 8 to 12 inches. The diameter of twist is limited so that the overall diameter of the probing element along its full length excepting for the bowed out regions is no more than 1/16 inches and the drill hole itself has a nominal 1/16 inch diameter and an axial length as long as necessary to reach regions of suspected decay. The length of the drill hole should be long enough to admit points 32 and 34 to the desired radial depth in the wood. The bowed out regions 32 and 34 are axially spaced from each other, preferably by an axial distance equal to or greater than the lateral distance between conductor portions 22 and 24.

During insertion of the probing element, the bowed out regions 32 and 34 are pressed inwardly to within essentially the same geometric envelope as the balance of the length of the probing element and expand outwardly only as allowed by decreasing physical resistance of the wood structure e.g. in a decayed region thereof. If the wood is too dry to provide an electrolytic conductive path between the regions 32 and 34, then distilled water or other polar liquid may be fed into the drill hole and a stirring element such as a pipe cleaner may be inserted to spread water into the wood fibers at the wall of the hole in the region to be occupied by end 30 of the probe.

There has been described novel wood probing apparatus and technique including a probe that is inexpensive, reliable, easy to insert and remove and helps to make repeatable measurements. The invention may be utilized in detecting decay in living or dead trees, wooden posts and beams and framing in houses, trestles, bridges, railroad ties, poles and other structures and in lumber. The invention may also be used to detect conditions of incipient and potential decay and non-decay related conditions reflected in changing cation concentration. For instance, wetness in kiln dried lumber may be detected through use of the present invention as an aid to monitoring and adjusting kiln drying schedules for increased efficiency and/or reliability.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Probing apparatus for measuring cation concentration in wood structure comprising, means including first and second insulatedly separated wires defining a probing element for establishing a portion of a current path in the interior of wood, the probing element defining means comprising means forming an axially elongated insertable end thereof with spaced points thereon for conductive contact with internal walls of said wood, said means defining an insertable end being yieldable to within a first compressed geometric cross-section envelope for insertion through narrow internal passages within the wood and expandable to positively contact internal walls of the wood when measuring, means defining a flexible, stiff major length portion of the probing element, and means for essentially insulating said wires from the wood except in the region of said spaced points.

2. Probing apparatus in accordance with claim 1 wherein said probing element defining means comprise two insulated conductors which are cyclically deformed over major portions of their respective lengths.

3. Probing apparatus in accordance with claim 2 wherein said conductors are helically twisted in opposite senses to form a twisted pair.

4. Probing apparatus in accordance with claim 1 wherein the said conductors comprise bowed out regions thereof with respect to the probing element axis, the said bowed out regions of the respective conductors being longitudinally displaced from each other, the said spaced points being located at peaks of said bowed out regions.

5. Probing apparatus in accordance with claim 4 wherein said cross-section envelope has an area no greater than that of corresponding essentially to a circle of ¼ inch diameter.

6. Probing apparatus in accordance with claim 5 wherein said envelope is a bore of 1/16 inch diameter and said conductors comprise 19 to 21 gauge wire helically twisted at 11 to 13 turns per inch over a majority of a length of 6 to 12 inches within the insertable end of the probing element.

7. Probing apparatus in accordance with claim 6 and further comprising, means for generating a pulse current through said multiple conductors, means for measuring impedance in the wood in a current carrying path therein which is part of a circuit loop including said conductors and said pulse current generating means.

8. Probing apparatus in accordance with claim 1 and further comprising, means for generating a pulse current through said multiple conductors, means for measuring impedance in the wood in a current carrying path therein which is part of a curcuit loop including said conductors and said pulse current generating means.

9. Method of measuring cation concentration in wood utilizing a probing element including first and second insulatedly separated wires defining a probing element for establishing a portion of a current path in the interior of wood and comprising means forming an axially elongated insertable end thereof with spaced points thereon for conductive contact with internal walls of said wood with the means forming an insertable end being yieldable to within a first compressed geometric cross section envelope for insertion through narrow internal passages within the wood and expandable to positively contact internal walls of the wood when measuring and a flexible stiff major length portion of the probing element with means for essentially insulating the wires from the wood except in the region of the spaced points, which method includes the steps of forming an axially elongated hole in the wood to and beyond a depth of an internal region of the wood to be measured, inserting the probing element to a depth such that said spaced points of the element reach said internal region of the wood to be measured, and passing a current through said conductors and measuring the resistance to current flow.

10. Cation concentration measuring method in accordance with claim 9 and further comprising, adding polar liquid to the internal region of the wood to be probed to exceed saturation limits of wood fibers in the probed region.

* * * * *